UNITED STATES PATENT OFFICE.

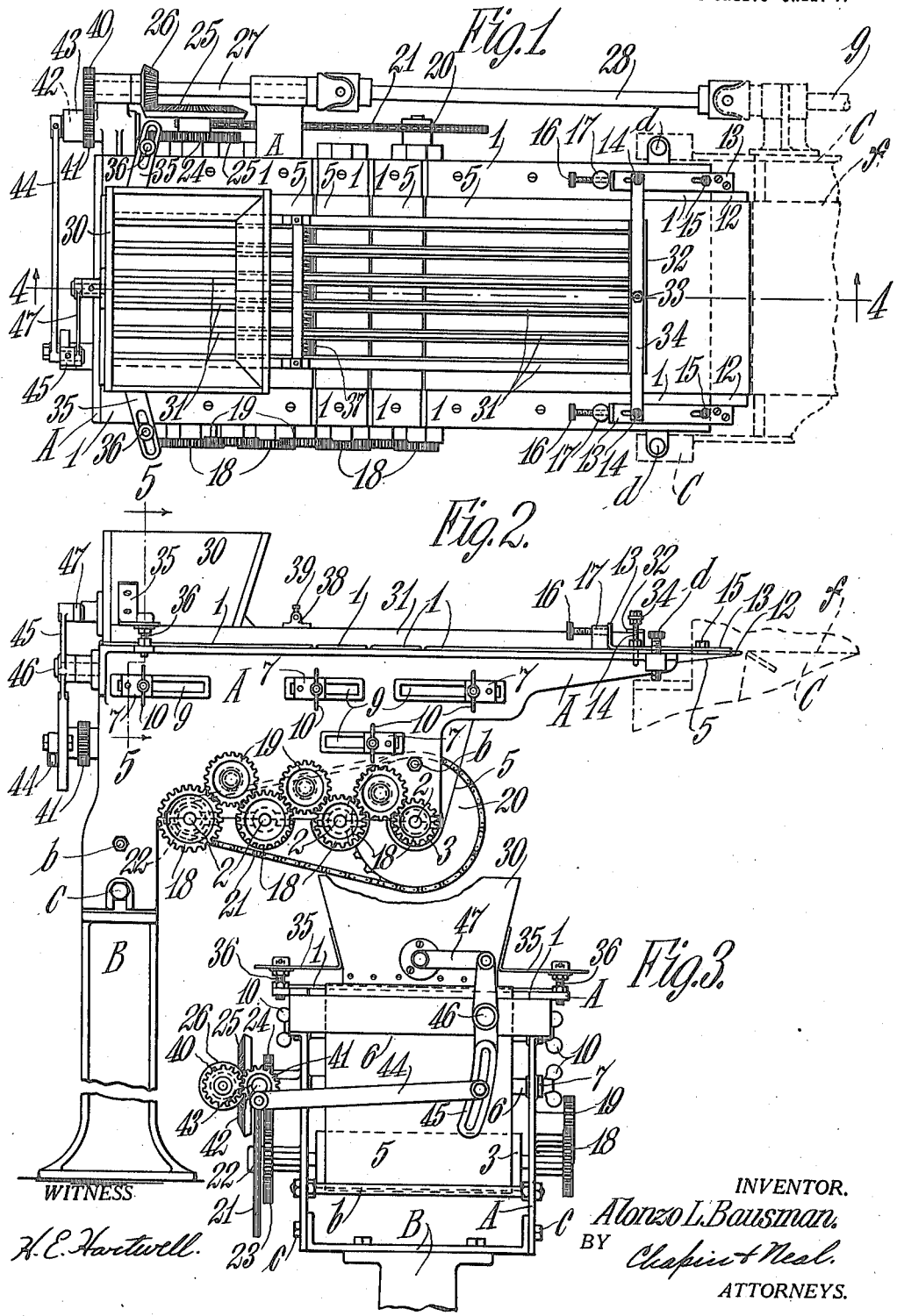

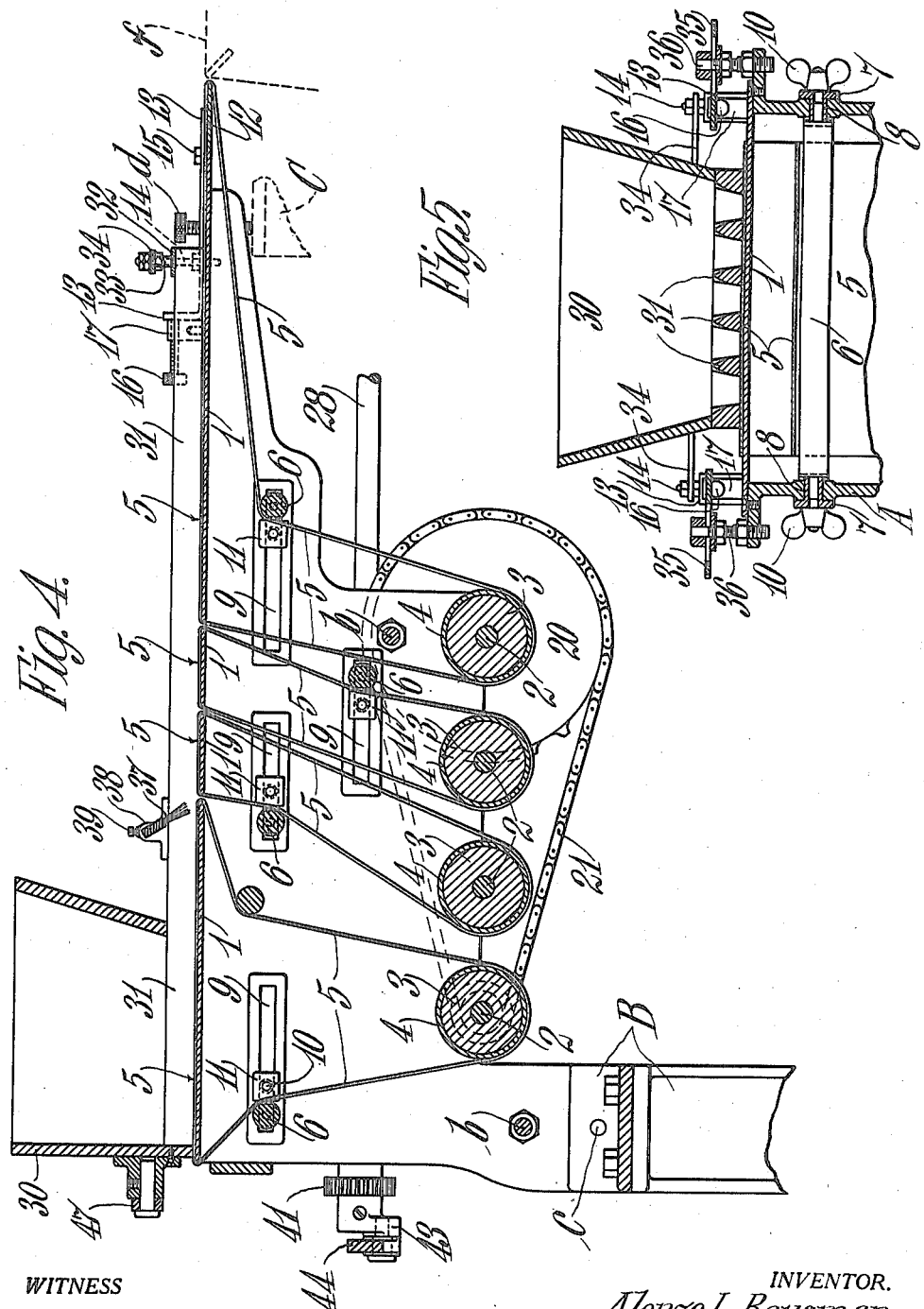

ALONZO L. BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

FEEDING APPARATUS FOR COATING-MACHINES AND THE LIKE.

1,263,638.     Specification of Letters Patent.     Patented Apr. 23, 1918.

Application filed May 29, 1916. Serial No. 100,564.

*To all whom it may concern:*

Be it known that I, ALONZO LINTON BAUSMAN, a citizen of the United States of America, residing at Chicopee, in the county of Hampden and State of Massachusetts, have invented certain new and useful Improvements in Feeding Apparatus for Coating-Machines and the like, of which the following is a specification.

This invention relates to feeding apparatus and more particularly to an improved apparatus adapted for use with a coating machine to feed nuts or other centers thereto in uniform spaced relation. More especially the invention is an improvement in the feeding device disclosed in the U. S. Letters Patent No. 791,243, granted May 30, 1905, to Gabriel Carlson.

An object of the invention is to provide in a feeding apparatus, a receptacle and a series of differentially driven conveyers to withdraw the centers from the receptacle and to separate them into the desired longitudinal spacing, the receptacle having forwardly extending channel forming portions to hold the centers in the desired lateral spacing, the construction being in part characterized by lateral confinement of the centers until the desired longitudinal spacing has been effected.

Another object of the invention is to provide in apparatus of the class described, a hopper having as a part thereof forwardly extending channel forming arms to laterally space centers fed from the hopper, the hopper and arms comprising a unitary structure adapted for convenient application to and removal from a series of differentially driven conveyers, the latter forming a unitary self contained structure adapted for convenient application to a coating machine, said hopper and arms having a three point support adapted to permit limited lateral vibratory movements and to hold the hopper and arms in contiguous relation with said conveyers.

A further object of the invention is to provide a feeding apparatus of generally simplified and improved mechanical structure. Other objects and advantages will appear in the detailed description to follow and in the annexed claims.

For the purpose of illustrating one manner in which the invention may be practised, a single preferred embodiment thereof is shown in the accompanying drawings, in which, Figure 1 is a plan view of the apparatus,
Fig. 2 is a side elevational view thereof,
Fig. 3 is an end elevational view,
Fig. 4 is a sectional elevation taken on the line 4—4 of Fig. 1 and looking in the direction of the arrows, and
Fig. 5 is a cross sectional view taken on the line 5—5 of Fig. 2 and looking in the direction of the arrows.

Referring to these drawings in detail, the feeding apparatus is preferably constructed, as shown, in a unitary self-contained structure which is in the nature of an attachment to be connected to and disconnected from a coating machine quickly and conveniently when desired. Two side frames A, held together in spaced relation by a pair of tie rods *b*, are pivotally connected at one end by studs *c* to a floor supported pedestal B. Mounted in lugs at the other end of frames A are set screws *d* which, as shown in Figs. 1 and 2, are adapted to rest upon a flange or other suitable part of a coating machine C to adjustably support the frame therefrom.

Extending across the frames A and secured thereto by the screws shown in Figs. 1 and 5 are a plurality of plates 1, four being shown in the drawings. Rotatably mounted between frames A and adjacent the lower portions thereof are four shafts 2 which bear rolls 3 preferably provided with a covering 4 of rubber or the like. A belt 5 passes over the upper surface of each plate 1 (Fig. 4) and around a roll 3, which latter is driven by means to be described. An idler roll 6 slidably mounted in frames A is provided for each belt 5 whereby the tension of the latter may be adjusted as desired. Each roll 6 is journaled in a pair of plates 7 which have integral rectangular blocks 8 slidable in slots 9 formed in frames A. Thumb screws 10 pass through plates 7 and slots 9 and are provided with nuts 11 on the inner sides of frames A, so that the plates 7 and thus rolls 6 may be securely held in their various positions of adjustment.

The plates 1 are arranged in a common and substantially horizontal plane and in close proximity one to the other so that the several belts 5 form a flat and substantially continuous surface. This surface is adapted to lie in the plane of the wire belt $f$ of coating machine C, and, if the planes of belts 5 and $f$ do not exactly coincide, the end of the last belt 5 may be brought to the same height as wire belt $f$ by adjustment of screws $d$. It sometimes happens that, when the frame of the feeding attachment is positioned in supporting engagement with coating machine C, the last belt 5 and wire belt $f$ are not in sufficiently close relation. To provide for a horizontal movement of the last belt 5 to remedy this difficulty, a plate 12 is provided at the end of last plate 1 which is secured as shown in Fig. 1 to angle irons 13 one on either side of belt 5. The members 13 are held to plate 1 by studs 14 and 15 (Figs. 1, 2, and 4) which pass through slots in the member 13 so that the latter is slidable horizontally within limits to move belt 5 into close proximity with belt $f$. Screws 16 having a threaded engagement with blocks 17 secured to frames A are arranged to move members 13 in an obvious manner.

Mounted on each shaft 2 outside frame A (see Fig. 2) is a driving gear 18 and the several gears 18 are driven one from another by idlers 19 suitably mounted on frame A. The gears 18 are of different diameters, which increase uniformly from the right to the left as viewed in Fig. 2. The right hand shaft 2 has fixed to its other end a sprocket 20 which is driven by a chain 21 from a sprocket 22. The latter is fixed to a gear 23 which is loosely mounted on the left hand shaft 2, as shown in Figs. 1 and 2. Gear 23 is driven from a gear 24 fixed to a bevel gear 25 and the latter meshes with a bevel pinion 26 on a short shaft 27. The latter is mounted in suitable bearings formed on frame A and may be driven from any suitable source of power. Preferably, however, it is connected by a universal joint to a shaft 28 which also has a universal joint adapted to connect with the drive shaft $g$ of the coating machine C.

A hopper 30 is adapted to contain the material to be fed to the coating machine and secured to the lower portion thereof are a plurality of bars 31 which extend forwardly from the hopper and are held together in spaced relation by a plate 32. The latter is pivotally supported by a centrally located stud 33 from a cross plate 34 which in turn is supported at its ends by the studs 14 heretofore described. Secured to each side face of the hopper 30 are brackets 35 which have horizontal slotted portions. Studs 36 adjustably connected with frame A, as best shown in Fig. 5, are arranged to ride in the slots in brackets 35 to support the latter, and the slots are curved from the stud 33 as a center. The hopper and bars are thus supported at three points and in such a manner that the belts 5 are substantially contiguous thereto and close the bottom of the hopper 30 and the spaces between bars 31.

Just forwardly of the hopper 30 is a brush 37 which is supported in brackets 38 secured to the outer pair of bars 31 and is adjustably held therein by set screws 39 so that the bristles of the brush may lie at any desired distance below the top of bars 31.

Hopper 30 is arranged to reciprocate laterally of belts 5 by means now to be described. A gear 40 (Fig. 3) fixed to drive shaft 26 drives a gear 41 on a stud 42 and fixed to the latter is a crank 43. A link 44 connected at one end with the latter is adjustably connected at its other end to a lever 45 by a stud riding in the arcuate slot of the lever, as shown in Fig. 3. Lever 45 is pivoted intermediate its ends at 46 and its upper end is connected by a link 47 to the hopper 30, as clearly shown in Fig. 5.

The operation of the feeding apparatus will now be fully described. It will be seen from the foregoing detailed description that the several belts 5 are driven at different speeds which progressively increase in the direction of travel. Thus, the first belt 5 runs slower than the second, the second slower than the third, and so on. If desired, the wire belt $f$ may be driven at a higher speed than the last belt 5. The belts 5 close the bottom of hopper 30 and its extensions 31. Nuts or other centers for the coating machine operation placed in hopper 30 are, therefore, drawn out from below by the first belt 5 and carried therewith between the spaced bars 31. The latter hold the centers in the desired lateral spacing and the longitudinal spacing is obtained by the differential speed of the belts 5. Thus, the centers are gradually separated with an increment of separation to each belt 5 so that, as the goods pass onto the wire belt $f$ of the coating machine C, they are arranged in the desired lateral and longitudinal spacing. The lateral rocking movement of the hopper 30 shakes the nuts or other centers down upon belt 5. Thus, supposing two nuts to be superposed, the rocking movement would throw upper from the lower and upon the belt 5. The shaking movement is thus designed to cause the centers to leave hopper 30 in close succession and in a single layer. If, for any reason, two centers do leave hopper 30 in superposed relation, the brush 37 will hold back the upper center and permit the passage of the lower one only so that the possibility of the centers passing onto wire belt *f* in any but the desired arrangement is effectively guarded against.

The apparatus described is particularly characterized by a unitary self contained structure, which may be applied quickly and conveniently to a coating machine. It is not "built in" with the latter but is a distinctly separate machine and is designed for easy attachment to any confectionery coating machine or other desired machine. Thus, it may be used, when desired, and when not desired is easily removable with a minimum of time and effort. The hopper 30 and bars 31 also form a secondary unitary structure which may be removed from the belts 5 and frames A conveniently since it is supported at three points only from the frames and requires simply the removal of the collars on studs 36 and the upper nuts on studs 14. The hopper and bars are rigidly connected together and in reality form one hopper member. The bars 31 preferably extend substantially the entire length of the machine lying upon all four of belts 5. This feature is important in that the lateral positioning of the centers is preserved until they have been brought into the desired longitudinal spacing. A positive lateral support for the centers is provided to hold them from transverse movement during their transition from belt to belt at increasing speeds.

Thus, an improved feeding apparatus for confectionery coating or like machines, to which articles are to be fed in the stated way, has been provided which is characterized by generally improved mechanical structure and is adapted to efficiently feed and space the centers to be coated. It is recognized that changes may be made in the structure herein described for illustrative purposes without departing from the scope of the invention which is defined by the appended claims rather than by the foregoing description of one preferred form.

What I claim is—

1. A feeding apparatus, comprising, a receiving hopper open at the bottom, a series of spaced bars fixed to the hopper and dividing the bottom thereof into a plurality of channels, said bars extending forwardly to a distance from the main part of the hopper, a plurality of conveyers arranged to close the bottom of said channels, and means to drive said conveyers at progressively increasing speeds, all constructed and arranged so that centers may be withdrawn from the hopper and gradually separated into the desired longitudinal spacing before they leave said channels.

2. A feeding apparatus, comprising, a receptacle for centers to be fed, having an open bottom, and a series of bars dividing the bottom of the receptacle into a plurality of channels, said bars extending forwardly to a distance from the receptacle, means rigidly connecting the forward ends of said bars, a central pivotal support for said means, a plurality of conveyers arranged to move in contiguous relation to the lower face of said bars to close said channels, means to drive said conveyers at different speeds increasing progressively in the direction of travel, whereby centers may be withdrawn and separated into the desired longitudinal spacing while laterally confined by said bars, and means to reciprocate the hopper and bars laterally of said conveyers.

3. A feeding apparatus, comprising, a receptacle for centers to be fed having an open bottom and a series of bars dividing the bottom of the receptacle into a plurality of channels, said bars extending forwardly to a distance from the receptacle, means rigidly connecting the forward ends of said bars, a central pivotal support for said means, a plurality of conveyers arranged to move in contiguous relation to the lower face of said bars to close said channels, means to drive said conveyers at different speeds increasing progressively in the direction of travel, whereby centers may be withdrawn and separated into the desired longitudinal spacing while laterally confined by said bars, means to reciprocate the hopper and bars laterally of said conveyers, and a brush supported from said bars and arranged to extend into said channels, said brush and reciprocating means arranged to confine the centers fed from the receptacle to a single layer.

4. A feeding apparatus, comprising, a supporting frame, a series of belts arranged to move over the top thereof in close proximity to one another to form a substantially unbroken conveying surface, means to drive said belts at different speeds increasing progressively in the direction of travel, a receiving hopper open at the bottom thereof, a series of bars fixed to the hopper and arranged to divide the bottom thereof into a plurality of channels, said bars extending forwardly from the hopper to overlie all of said belts, means rigidly connecting the forward ends of said bars, a central pivotal supporting connection between said means and said frame, a support on either side of said hopper arranged to permit limited swinging movement of the latter and said bars on said pivot, and vibratory means to cause such swinging movement, said pair of supports and pivotal connection adapted to support the hopper and its bars in contiguous relation to said belts, whereby centers may be withdrawn from the hopper and spaced longitudinally and transversely on said belts.

5. A belt feeding apparatus which consists of a hopper open at the bottom, a series of spaced parallel bars arranged in the plane of the hopper bottom and fixed to the hopper to extend forwardly therefrom, a plurality of feeding belts mounted below the hopper to form a bottom for it and the channels formed by the bars, and means to drive the belts at different speeds and vibrate the hopper and bars transversely of the belts.

ALONZO L. BAUSMAN.